United States Patent [19]

Remensperger

[11] 3,915,282

[45] Oct. 28, 1975

[54] CENTERING ARRANGEMENT FOR DOUGH PORTIONS

[75] Inventor: Franz Remensperger, St. Georgen, Germany

[73] Assignee: Fr. Winkler KG Spezialfabrik fur Backereimaschinen und Backofen, Villingen, Germany

[22] Filed: Mar. 13, 1974

[21] Appl. No.: 450,842

[30] Foreign Application Priority Data

Mar. 14, 1973 Germany.......................... 2312580

[52] U.S. Cl. .................................................. 198/30
[51] Int. Cl.² ........................................ B65G 47/26
[58] Field of Search ......... 198/29, 30, 32, 237, 262, 198/244

[56] References Cited

UNITED STATES PATENTS

| | | | |
|---|---|---|---|
| 1,527,337 | 2/1925 | Wilcox.................................. | 198/32 |
| 2,781,119 | 2/1957 | Talbot et al. ......................... | 198/29 |
| 2,978,092 | 4/1961 | Phillips et al. ....................... | 198/32 |
| 2,986,262 | 5/1961 | Powers.................................. | 198/29 |
| 3,523,618 | 8/1970 | Nielsen................................. | 198/32 |

FOREIGN PATENTS OR APPLICATIONS

| | | | |
|---|---|---|---|
| 398,448 | 9/1933 | United Kingdom.................. | 198/30 |

*Primary Examiner*—Richard A. Schacher
*Attorney, Agent, or Firm*—Haseltine, Lake & Waters

[57] ABSTRACT

An arrangement for effecting the orientation of dough portions which extend transversely to the direction of transportation thereof through a bread-making installation without imparting any force to the dough portion itself, so as to be symmetrical relative to the center of the installation. For the alignment of the dough lengths, the latter are individually deposited on an intermediate conveyor belt which may additionally be moved, as a complete entity, transversely to the direction of longitudinal conveyance. Preferably, two guide or boundary beams control the transverse movement of the intermediate conveyor installation through the intermediary of the suitable drive. As the guide beam there may be utilized any linearly directed energy exchange between a transmitter and a receiver, such as for example, a light-or ultrasonic beam.

10 Claims, 3 Drawing Figures

CENTERING ARRANGEMENT FOR DOUGH PORTIONS

FIELD OF THE INVENTION

The present invention relates to a centering arrangement for dough portions, and particularly dough lengths, which are produced and processed in a fully automatic bread-making installation, which facilitates the correction of the position of the dough portion at right angles to the direction of its forward movement.

DISCUSSION OF THE PRIOR ART

In the fully automatic production of dough portions in a bread-making installation, prior to the conveyance thereof into a baking oven, various shaping, fermenting, and distributing stations are traversed. Dough portions which extend transversely to the direction of conveyance, particularly elongate dough lengths, during distribution, lengthwise rolling, or a similar operating process, are subjected to an uneven displacement from their symmetrical axis and center of the installation at right angles to their direction of conveyance. A subsequent cutting of a dough length with a fixed cutting arrangement into equally weighted segments is not possible for dough lengths which are asymmetrical or offset relative to the center of the installation. Forming the dough lengths by means of conductor or guide surfaces, or by means of rollers, is not advisable since any external forces acting on the dough length for correcting the position thereof, will lead to deformations and squeezing of the dough at the contact surfaces with the correcting arrangement. Due to the foregoing, heretofore, during the production of lengthy or elongate dough portions there were effected a number of processing steps which eliminated a subsequent required centering, so as to assume losses in the quality of the baked goods.

SUMMARY OF THE INVENTION

Accordingly, it is an object of the present invention to provide an arrangement for effecting the orientation of dough portions which extend transversely to the direction of transportation thereof without imparting any force to the dough portion itself, so as to be symmetrical relative to the center of the installation.

The foregoing object is inventively attained in that for the alignment of the dough lengths, the latter are individually deposited on an intermediate conveyor belt which may additionally be moved, as a complete entity, transversely to the direction of longtitudinal conveyance. Preferably, two guide or boundary beams control the transverse movement of the intermediate conveyor installation through the intermediary of a suitable drive. As the guide beam there may be utilized any linearly directed energy exchange between a transmitter and a receiver, such as for example, a light-or ultrasonic beam. Both guide beams preferably form above the intermediate conveyor installation the side lines of a trapezoid within which are positioned the dough portions which are to be centered. The light beams intersect at an imaginary cutting point which is located downstream of the centering position in the direction of conveyance. A dough length, which is deposited at a sideways displacement or offset on the intermediate conveyor installation, or respectively, centering installation, either sooner or later, pursuant to the extent of offset, cuts through one of the guide beams.

The interruption of a guide beam by a dough length activates the drive for effecting the transverse movement. The dough portion is moved in the direction toward the axis of symmetry for such a period until the other guide beam is interrupted, and upon which the transverse movement is discontinued. In this location it is then deposited onto the subsequent conveyor belt. The angle which is formed by the two guide beams is dependent upon the length of the dough portion and upon the maximum offset at right angles relative to the direction of conveyance. The smallest distance between the two guide beams must be smaller than the lengths of the dough portions. The speed of the intermediate conveyor belt is greater than that of the infeed belt and the further or receiving conveyor belt. This will provide for sufficient time in order to allow the centering installation to be automatically returned again into its exit position after each centering sequence.

BRIEF DESCRIPTION OF THE DRAWINGS

In the following detailed description, an exemplary embodiment of the invention is described in greater detail in conjunction with the accompanying drawings, in which.

DETAILED DESCRIPTION

Figure 1:
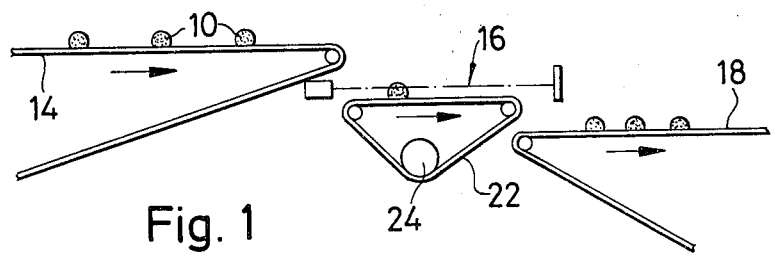
FIG. 1 schematically illustrates a side view of a centering installation according to the present invention.

Referring now in detail to the drawings, dough portions or dough lengths 10 which evince an unequal sideways offset relative to a center line or symmetrical conveyance axis 12 (FIG. 2), are deposited singly from an infeed belt 14 onto an intermediate conveyor installation 16 which represents a centering installation, so as to be transported by the latter, while eliminating a sideways offset relative to the symmetrical axis 12, toward a further or receiving conveyor belt 18.

Figure 2:
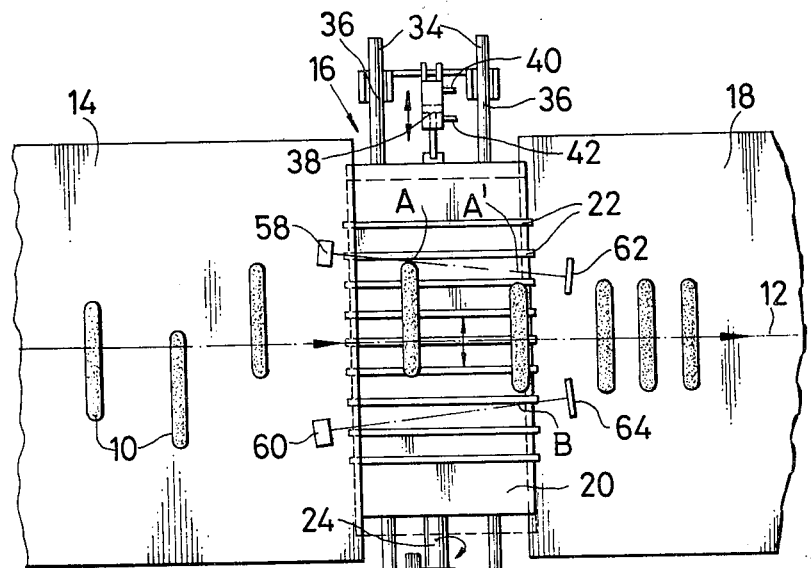
FIG. 2 is a detailed plan view of the centering installation of FIG. 1.

In accordance with FIG. 2 of the drawing, the intermediate conveyor installation 16 includes a sideways displaceable carriage 20 having conveyor elements 22, preferably formed of endless conveyor chains or belts. These are moved sideways in conjunction with the carriage 20 and are driven by a drive shaft 24 along the horizontal upper surface of the carriage toward the center line or axis 12. The drive shaft 24 is rotated through a drive belt 28 and a concurrently sideways movable gear drive 26 by a motor 30, the latter of which is fastened to a stationary frame 32. The sideways displacement between the gear drive 26 and the drive shaft 24 during the carriage movement is balanced by a corresponding sliding movement between the gear teeth of the drive 26. The carriage 20 is provided with guide rods 34 on both sides thereof, which are supported in stationary slide bearings 36.

At one side of the carriage 20 there is located a double-acting feed control cylinder unit 38, which is fastened on one side thereof to a stationary element and at its other side to carriage 20 so as to move the latter, after application of pressure to a first inlet 40, relative to the direction of movement of the belts 14, 18 toward the right, or to the left if appyling pressure to a second inlet 42. Preferably, the feed control cylinder may be a double-acting pneumatic or hydraulic cylinder 38.

Furthermore, at the other side of the carriage 20, connected to the stationary frame 32 is an operating cylinder 44 which has pressure inlets 82 and 84. The free end of the piston rod of the cylinder supports a control cam element 46. In the element 46, extending from an intermediate position 50, there are formed symmetrical control cams 52, within which may slide a guide element 54 located at the end of an extension 56 on the guide rods 34.

Upon a sideways displacement of the carriage 20, the guide element moves, upon longitudinal displacement of the control cam element 46, along one of the control cams 52 in the conveying direction of belts 14 and 18. The sideways displacement of the carriage 20 for correcting the position of the dough portions 10 is always attained through the application of pressure at the inlet 82 of the operating cylinder 44, wherein concurrently, depending upon the direction of the sideways displacement, left or right, the feed control cylinder 38 is pressurized at the pressure inlets 40 or 42. After termination of the sideways displacement, through return movement of the similarly preferably pneumatically or hydraulically actuated operating cylinder 44 and through the control cam 52, there may be effected a return movement of the carriage 20 into a predetermined sideways centered or outlet position, so that pressure is applied only at the inlet 84. The inlet 82 of the operating cylinder 44, and the inlets 40 and 42 of the feed control cylinder 38 become pressureless upon the return position of the carriage 20.

The obtention of the sideways positioning of the dough portions 10, and the control of the cylinders 38 and 44, are assumed by means of two guide beams, preferably in the form of light beams, which effectively extend between a transmitter 58 and, respectively, 60, and a receiver 62 and, respectively, 64. For this purpose, the transmitters may each comprise a light source, and the receivers may each be a photoresistance, a photocell, or the like. The transmitters 58, 60 and the receiver 62, 64 are located on a trapezoid which narrows in the conveying direction of the belts 14, 18. The transmitter and receiver may also be located within an apparatus. In that case, the described receivers 62 and 64 may be constructed only of mirrors.

The dough portion 10, which is to be centered, interrupts a guide beam, for example at point A. Consequently, the intermediate conveyor installation 16 is placed into movement in a direction towards the other guide beam, and namely for so long, until the dough portion also interrupts the other guide beam at point B.

At this instant the transverse displacement of the carriage 20 is interrupted. The speed of the conveyor elements 22, and speed of transverse movement are so correlated with respect to each other, that point A wanders during the centering sequence along one of the guide beams in a direction towards point A'. The centering sequence is terminated when both guide beams are concurrently interrupted. The mutual distance between both transmitters 58, 60 must be larger than the length or, respectively, the transverse dimensions of the dough portions, in addition to the maximum displacement occurring in both directions. The mutual distance between both receivers 62, 64 must, in contrast therewith, be smaller than the length of the dough portions. Subsequent to the centering, the dough portions 10 are conveyed from the intermediate conveyor installation 16 to the subsequently actuated outlet conveyor belt 18.

It is essential that, at any instance, only one dough portion 10 is positioned on the intermediate conveyor installation 16, so as to permit correction of unequal displacements thereof independently of each other. As soon as the centered dough portion has left the intermediate conveyor installation, which may be ascertained by means of a light barrier, centering of a subsequent dough portion 10 becomes possible.

Figure 3:
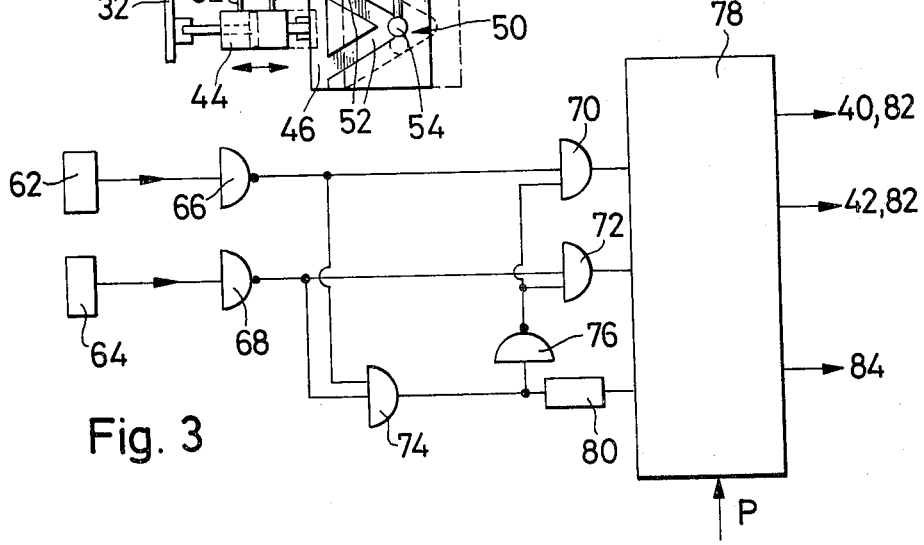
FIG. 3 is a schematic circuit diagram for effecting the control sequences for the centering installation.

Referring now to FIG. 3 of the drawing, there is illustrated a possible embodiment of an electrical-pneumatic, or respectively, electrical-hydraulic control arrangement. As soon as one of the receivers 62, 64 upon interruption of the guide beam, no longer emanates an electrical signal, such as for example receiver 62, then at the output of a subsequently switched-in inverter element 66, there is produced a logic "1", which is in turn transmitted through an AND-element 70 to a pressure control unit 78. Thereby, the first inlet 40 of the feed control cylinder 38, and the inlet 82 of the operating cylinder 44 are provided with a pressure p for effecting centering movement of the carriage 20 towards the right. Naturally, it may be understood that the foregoing also applies to the reverse case, in effect, an interruption of the other guide beam, so that a logic 1 is formed at the output of an inverter element 68, which is transmitted through the AND-element 72 to a pressure control unit 78 so as to displace the carriage 20 towards the left through the application of pressure to the second inlet 42 of the feed control cylinder and the same inlet 82 of the operating cylinder.

After the completed centering sequence, both guide beams are interrupted, and an AND-element 74 in this condition generates a logic 1 which is converted in an inverter element 76 into a logic "0". This signal is then supplied to the AND-elements 70 and 72 as a closure signal so that the feed control cylinder 38 having both inlets 40, 42 supplied with pressure prior to closure, is fully switched-off and vented.

Concurrently, the logic 1 at the output of the AND-element 74 is transmitted through a delay element 72 to the pressure control uniti 78, in which the delay time is so adjusted as to be larger than the time interval between the completion of the centering and the removal of the centered dough portion 10 from the intermediate conveyor installation 16. This will avoid the need for an additional light barrier. The signal provides in the pressure control unit 78 a throughput of the pressure p to the input 84 of the operating cylinder 44, whose piston is moved into its neutral position so that the pressure inlets 40 and 42 of the feed control cylinder 38, and the inlet 82 of the operating cylinder become concurrently pressureless.

As soon as a new dough portion 10 interrupts one of the guide beams, the logic 1 at the output of the AND-element 74 disappears, the closure of the AND-elements 70, 72 is lifted, the operating cylinder 44 has the pressure p switched off at the inlet 84 and is vented, and the centering sequence may commence anew.

While there has been shown what is considered to be the preferred embodiment of the invention, it will be obvious that modifications may be made which come within the scope of the disclosure of the specification.

What is claimed is:

1. Centering arrangement for dough portions, and particularly elongate dough lengths; comprising means for correcting the position of the dough portions at right angles to and symmetrically with the longitudinal center conveying axis of a fully-automatic bread-making installation; and means for conveying said dough portions through said installation, said position correcting means including an intermediate conveyor means for transporting said dough portions from an infeed to an outlet position in said installation, means for imparting lateral movement to said intermediate conveyor means relative to the forward conveying motion thereof, two guide beams for controlling the extent of said lateral movement, said guide beams being adapted to extend in linear directed energy paths, transmitter means for generating said guide beams, and receiver means associated with said transmitter means for receiving said guide beams.

2. Centering arrangement as claimed in claim 1, said guide beams comprising light beams.

3. Centering arrangement as claimed in claim 1, said guide beams comprising ultrasonic beams.

4. Centering arrangement as claimed in claim 1, said guide beams forming the side edges of a trapezoid, the corners of said trapezoid being defined by, respectively, said transmitter means and said receiver means, and the distance between said transmitter means being larger and between said receiver means being smaller than the lengths of said dough portions extending transversely across said installation.

5. Centering arrangement as claimed in claim 1, said intermediate conveyor means comprising a transversely movable carriage having conveyor elements; and at least one operating cylinder adapted to impart lateral movement to said carriage into and out of a neutral position.

6. Centering arrangement as claimed in claim 5, said operating cylinder comprising a pneumatic cylinder.

7. Centering arrangement as claimed in claim 5, said operating cylinder comprising a hydraulic cylinder.

8. Centering arrangement as claimed in claim 5, comprising an electrical-pneumatic control circuit for actuating said operating cylinder.

9. Centering arrangement as claimed in claim 5, comprising an electrical-hydraulic control circuit for actuating said operating cylinder.

10. Centering arrangement as claimed in claim 1, comprising logic circuit means adapted to convert electrical output signals from said receiver means into control signals; and pressure control means for actuating said intermediate conveyor means in response to said control signals.

* * * * *